United States Patent [19]

Stephenson

[11] Patent Number: 5,365,435
[45] Date of Patent: Nov. 15, 1994

[54] SYSTEM AND METHOD FOR QUANTITATIVE DETERMINATION OF MIXING EFFICIENCY AT OIL OR GAS WELL

[75] Inventor: Stanley V. Stephenson, Duncan, Okla.

[73] Assignee: Halliburton Company, Duncan, Okla.

[21] Appl. No.: 19,959

[22] Filed: Feb. 19, 1993

[51] Int. Cl.⁵ ............................................. G06F 15/46
[52] U.S. Cl. ................................. 364/420; 364/502
[58] Field of Search .................... 364/420, 502, 510; 366/17, 152; 73/861.04

[56] References Cited

U.S. PATENT DOCUMENTS

| | | | |
|---|---|---|---|
| 3,611,790 | 10/1971 | Brouwer et al. | 73/61.43 |
| 3,802,964 | 4/1974 | Forgacs et al. | 162/263 |
| 3,940,600 | 2/1976 | Alexander et al. | 364/502 |
| 4,474,204 | 10/1984 | West | 137/88 |
| 4,509,901 | 4/1985 | McTamaney et al. | 417/18 |
| 4,654,802 | 3/1987 | Davis | 364/502 |
| 4,764,019 | 8/1988 | Kaminski et al. | 366/15 |
| 4,779,186 | 10/1988 | Handke et al. | 364/172 |
| 4,792,915 | 12/1988 | Adams et al. | 364/724.19 |
| 4,818,113 | 4/1989 | Patel | 366/76 |
| 4,979,091 | 12/1990 | Albers | 364/148 |
| 5,003,814 | 4/1991 | Crawford et al. | 73/54.28 |
| 5,027,267 | 6/1991 | Pitts et al. | 364/502 |
| 5,033,321 | 7/1991 | Gerson | 73/866 |
| 5,058,012 | 10/1991 | Hinchman et al. | 364/420 |
| 5,103,908 | 4/1992 | Allen | 166/285 |
| 5,114,239 | 5/1992 | Allen | 366/6 |
| 5,281,023 | 1/1994 | Cedillo et al. | |

OTHER PUBLICATIONS

"Use of Computer Model to Perform Post-Job Analysis of Automatic Control System on Fracturing Blenders," Stephenson, S., SPE24006 (Mar. 1992).

*Primary Examiner*—Robert A. Weinhardt
*Attorney, Agent, or Firm*—Stephen R. Christian; E. Harrison Gilbert, III

[57] ABSTRACT

A system and method for determining, particularly quantitatively, a mixing efficiency of a mixing system, wherein a fracturing fluid, cement or other mixture is produced at an oil or gas well site, utilizes a mathematical model from which an ideal output characteristic is determined based on actual operating conditions obtained from the mixing system. The ideal output characteristic is compared to an actual output characteristic, and adjustments to the mixing system or an automatic control thereof can be made in response.

13 Claims, 4 Drawing Sheets

SYSTEM AND METHOD FOR QUANTITATIVE DETERMINATION OF MIXING EFFICIENCY AT OIL OR GAS WELL

BACKGROUND OF THE INVENTION

This invention relates to a control system and method based on determining whether a mixing system at an oil or gas well produces a mixture having an actual output characteristic that corresponds to a computed ideal output characteristic for the mixing system. In a particular aspect, such system and method determine the relationship between the actual sand concentration of a slurry mixed at an oil or gas well and an ideal sand concentration computed at the well using a mathematical model of the mixing system and actual sensed characteristics of the mixing system applied to the model.

Various types of fluids can be mixed at an oil or gas well. One type I will refer to for purposes of illustration is a fracturing fluid. A fracturing fluid includes at least a base fluid, typically including water, and a dry material, such as sand, referred to as proppant. Once mixed, the fracturing fluid is pumped into the well under pressure sufficient to fracture a subterranean formation and hold the fractures open with the proppant, thereby facilitating the production of hydrocarbons (oil or gas) found in the formation.

To make a fracturing fluid at a well, the base fluid is pumped into a mixing tub and the dry material is added. These inlet flows can be manually controlled in an attempt to obtain a mixture having some predesigned characteristic that can be measured, such as density or sand concentration derived from density. For example, an engineer might design a fracturing job wherein a fracturing fluid with a certain density is to be made and pumped down into the well. An operator at the well has the job plan and adjusts controls for the base fluid and/or proppant to try to obtain this density in the output mixture. The operator looks at the mixture and at an output densimeter and adjusts one or more of the inlet flows as needed. If the output characteristic is not being obtained by the operator's manual adjustments of the inlet flow(s), the operator knows that there is some mechanical problem in the mixing system.

Such mixing can also be done under automatic control implemented with a programmed computer. The computer is programmed with the desired characteristic (for example, the predesigned density in the example above) and it automatically controls one or more of the inlet flows in response to feedback from various sensors (for example, flow meters, level sensors and densimeters). Such automatic control is more efficient than manual control; however, if a desired output is not being obtained by such automatic control, it may not be readily apparent whether there is a problem with the controller or with the mechanical aspects of the mixing system. For example, that actual density is not within a given tolerance of the desired density at any one time is not necessarily indicative of whether the error is occurring because of a control system problem or because of a mechanical problem in the mixing process.

On the one hand, there is the need for an automatic control system to make the mixing at an oil or gas well more efficient as compared to manual control. This need has been met by the aforementioned type of automatic computer control that tries to produce a fracturing fluid having a density (for example) that equals a predetermined density set point entered in the computer. This, however, is still somewhat qualitative in that it in effect performs automatically only what the operator previously tried to do manually—that is, trying to match a measured output characteristic to a predetermined set point independent of the mixing system's capabilities.

On the other hand, there is the need for an independent or distinct control system and method that determines what the mixing system should be doing based on the actual inputs into the mixing system (which are caused such as by the prior primary automatic control) and what the mixing system is actually doing, regardless of the actual operating parameters under which the primary automatic control system is operating. This requires an analysis of the mixing system, not simply some predefined set point. Satisfying this need will facilitate determining whether a problem lies in the primary automatic control system or in the mechanical system. It is to this need that the present invention is directed.

SUMMARY OF THE INVENTION

The present invention overcomes the above-noted and other shortcomings of the prior art and satisfies the stated and other needs by providing a novel and improved system and method for quantitatively determining mixing efficiency of a mixing system at an oil or gas well. Such determination includes comparing an actual output characteristic with an ideal output characteristic computed from a mathematical model of the mixing system and actual sensed characteristics of the mixing system applied to the model. An advantage of this invention is that it can be used for control purposes by analyzing whether a problem that is detected is the result of a problem in a distinct automatic control system or in the mechanical mixing system.

The present invention provides a quantitative mixing efficiency determination system for controlling mixing at an oil or gas well site. This system comprises: a mixing system disposed at an oil or gas well site; means, connected to the mixing system, for sensing a plurality of actual characteristics of the mixing system; means for defining at the oil or gas well site a predetermined mathematical model of the mixing system and for providing at the oil or gas well site a numerical ideal output characteristic of the mixing system in response to the plurality of actual characteristics of the mixing system sensed at the oil or gas well site; means, connected to the mixing system, for sensing an actual output characteristic of the mixing system and quantifying the sensed actual output characteristic; and means, connected to the means for defining and providing and to the means for sensing an actual output characteristic, for comparing the numerical ideal output characteristic and the quantified actual output characteristic at the oil or gas well site to determine how closely the actual output characteristic corresponds to the ideal output characteristic.

The present invention also provides a method of quantifying mixing efficiency of a mixing system at an oil or gas well site, comprising: defining a mathematical model of the mixing system, including selecting a plurality of input parameters and an output parameter related to the input parameters; sensing a plurality of actual operating characteristics of the mixing system at the well site during operation of the mixing system, each of the actual operating characteristics being of the same type as a respective one of the input parameters of the mathematical model; sensing an actual output mixing characteristic of the mixing system during the operation of the mixing system; during the operation of the mixing system, inputting signals representing the sensed actual operating characteristics into a computer programmed with the mathematical model, each of these signals defining the respective input parameter; during the operation of the mixing system, defining an ideal output mixing characteristic, including computing a specific value for the output parameter of the mathematical model in response to the input signals; and during the operation of the mixing system, numerically comparing the ideal output mixing characteristic to the actual output mixing characteristic.

In a particular aspect, the present invention provides a method of determining the mixing efficiency of a mixing system having a base fluid and sand slurry mixed therein and pumped therefrom through a line from a tub of the mixing system to an oil or gas well, comprising: sensing input rate of base fluid provided to the tub and generating an electrical signal representative of the base fluid input rate; sensing input rate of sand provided to the tub and generating an electrical signal representative of the sand input rate; sensing the level of slurry in the tub and generating an electrical signal representative of the slurry level; sensing density of the slurry pumped from the tub through the line and generating an electrical signal representative of the slurry density; communicating the electrical signals at the well to a computer programmed with a mathematical model of the mixing system, the mathematical model including input parameters corresponding to base fluid input rate, sand input rate and slurry level; determining in the computer an ideal sand concentration, including solving the mathematical model in response to the communicated electrical signals; determining an actual sand concentration in response to the signal representative of the sensed density; and comparing the ideal sand concentration and the actual sand concentration for indicating at what sand concentration the base fluid can no longer transport the sand at a then existing agitation level.

Therefore, from the foregoing, it is a general object of the present invention to provide a novel and improved system and method for quantitatively determining mixing efficiency of a mixing system at an oil or gas well. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

The following publication is incorporated herein by reference: "Use of Computer Model to Perform Post-Job Analysis of Automatic Control System on Fracturing Blenders," Stephenson, S., SPE Paper 24006 (March 1992).

The present invention is for a mixing system at an oil or gas well. Two general types of such mixing systems are fracturing fluid mixing systems and cement slurry mixing systems. Specific systems are ones used or proposed by Halliburton Services of Duncan, Okla. (see, for example, the system disclosed in U.S. Pat. No. 4,779,186 to Handke et al., incorporated herein by reference); however, these are not limiting of the present invention.

Figure 1:
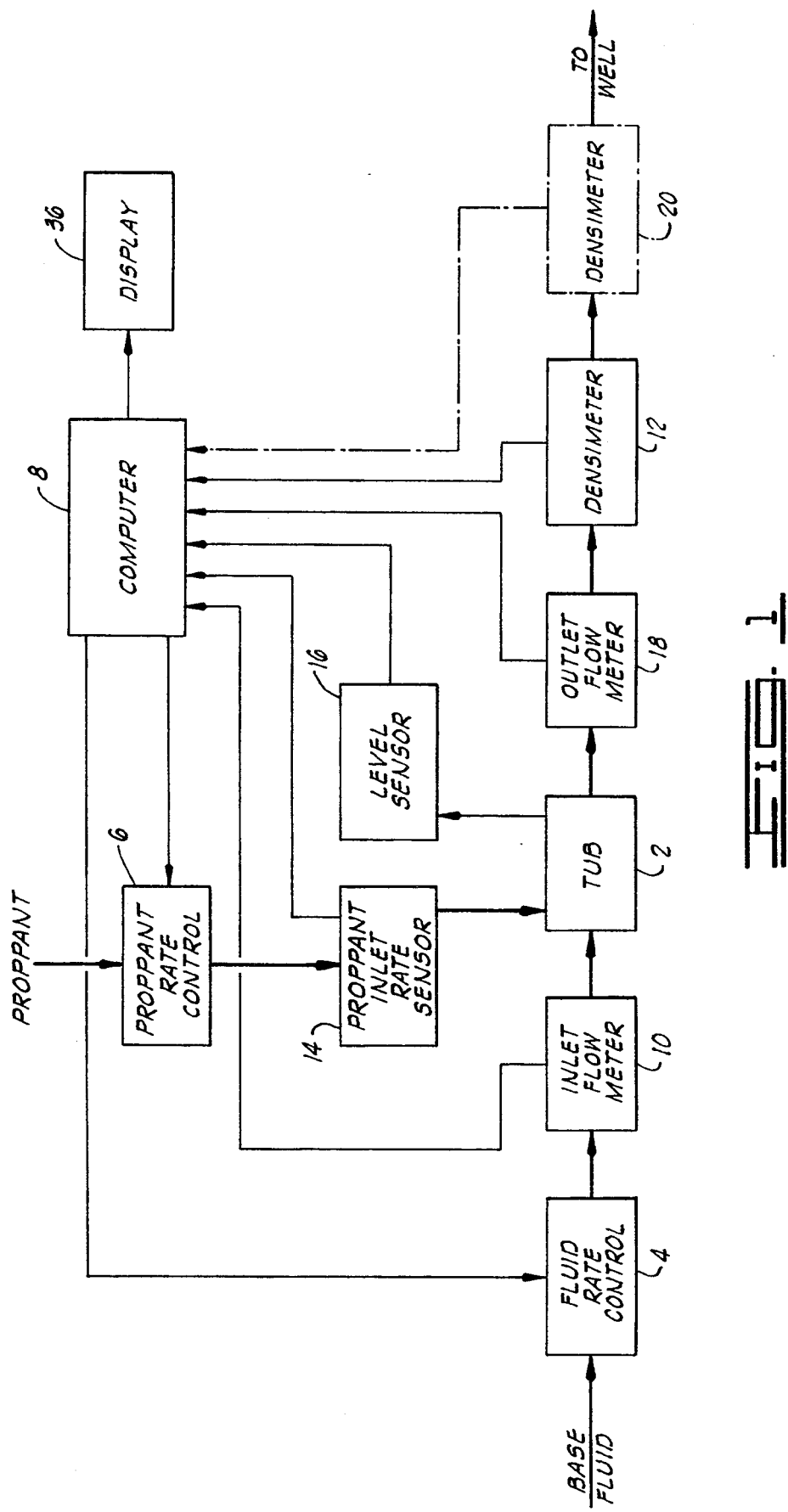
FIG. 1 is a block diagram of an automatically controlled mixing system adapted to the present invention.

Referring to FIG. 1, the mixing system disposed at an oil or gas well site includes a mixing tub 2, which may include one or more containers or vessels. At least a first material and a second material are mixed in the tub 2. Some means of agitating the mixed materials may be provided within the tub 2 as known in the art. For example, a mixing device such as one including blades mounted on a rotatable power-driven shaft (not shown) can be mounted in the tub 2.

The mixing system represented in FIG. 1 is for mixing fracturing fluids made of a mixture of at least a liquid base fluid (e.g., water) and a granular proppant (e.g., sand). The amounts of these materials input into the tub 2 are controlled through respective control devices or circuits shown as a fluid rate control 4 and a proppant rate control 6. These are known in the art, and in some implementations only one of the input materials may be controlled.

In the mixing system of the present invention, the fluid rate control 4 and/or the proppant rate control 6 are operated in response to automatic control from an automatic control program run in a computer 8. The automatic control program is responsive to inputs into the computer 8 indicating sensed actual operating characteristics of the mixing system. For example, the computer 8, under control of the automatic control program stored therein, may control the proppant rate control 6 in response to (1) an electrical signal from an inlet flow meter 10 monitoring the flow of the base fluid as it is pumped or otherwise flowed into the tub 2 and (2) an electrical signal from a densimeter 12 monitoring the density of the fracturing fluid mixture pumped from the tub 2. Other types of automatic control are known in the art.

FIG. 1 illustrates other devices that are used for sensing actual characteristics of the mixing system used in the preferred embodiment of the present invention described herein. A proppant inlet rate sensor 14 monitors the rate at which proppant is added into the tub 2; a level sensor 16 monitors the level of the mixture within the tub 2; an outlet flow meter 15 monitors the rate at which the mixed fracturing fluid exits the tub 2; and another densimeter 20 can be used farther downstream from the tub 2 than the densimeter 12.

In the preferred embodiment, the inlet flow meter 10 is disposed in an inlet conduit connected to the tub 2, the proppant inlet rate sensor 14 is connected to the proppant delivery subsystem, the level sensor 16 is inside the tub 16, and the devices 12, 18, 20 are in an outlet conduit or line extending from the tub 2 to the well. Other components can be included as would be readily apparent to those skilled in the art. Each of these devices is conventional, and each senses a respective actual operating characteristic of the mixing system and provides a respective encoded electrical signal to the computer 8 in known fashion for quantifying the sensed characteristic.

Figure 2:
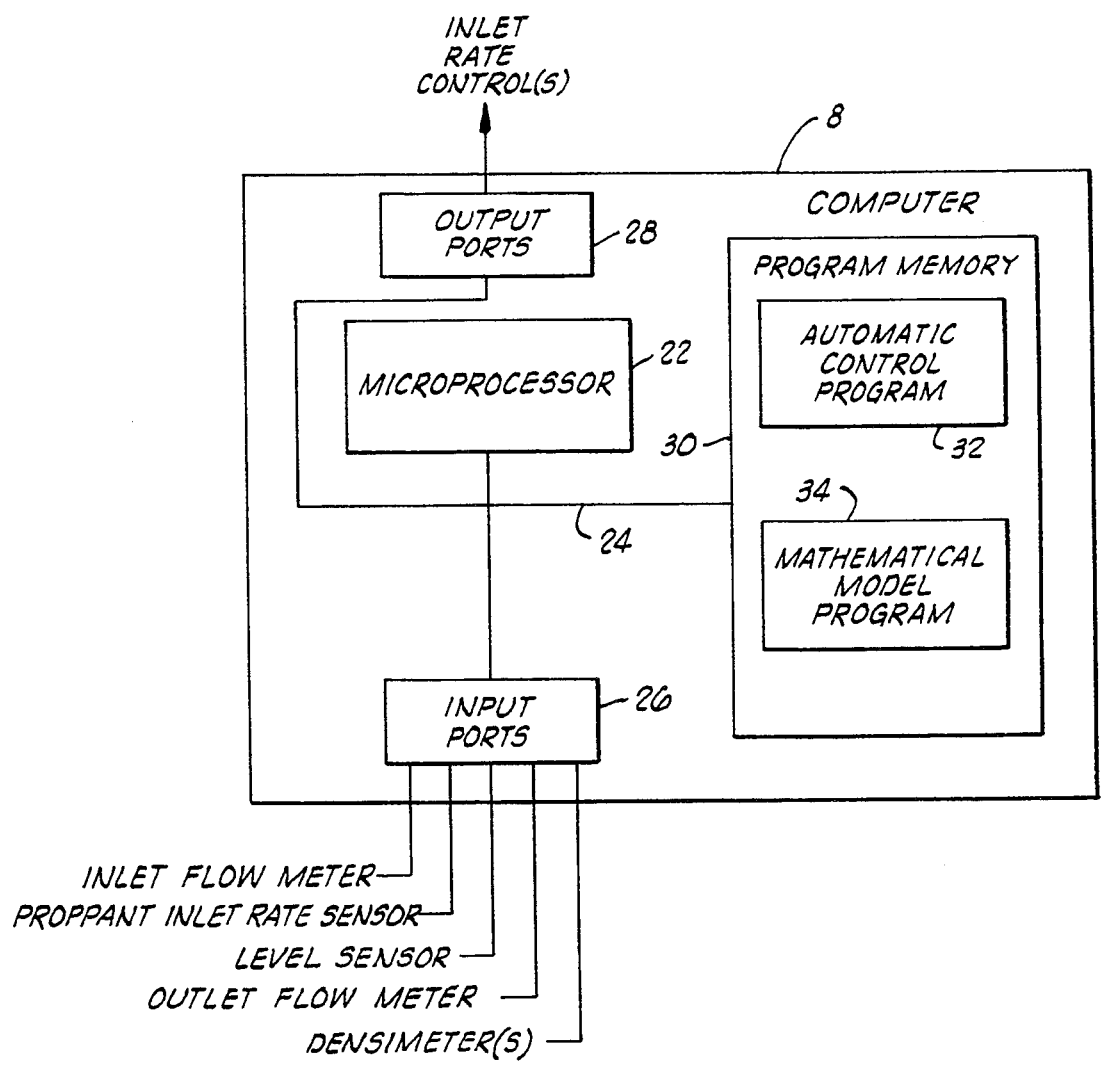
FIG. 2 is a block diagram of a computer of the present invention.

Referring to FIG. 2, parts of the computer 8 are represented. Although any suitably programmed computer can be used, a digital microcomputer having a microprocessor 22 as its central processing unit is represented in FIG. 2. Data, address and control buses/lines 24 connect the microprocessor 22 to input ports 26, output ports 28 and a program memory 30 as well as other devices as needed and known in the art. The input ports 26 receive the electrical signals from the various sensors previously described. The output ports 28 communicate control signals generated by the microprocessor 22 to the requisite control devices or loops (namely, the fluid rate control 4 and the proppant rate control 6 for the illustration of FIG. 1). The program memory 30 stores an automatic control program 32, such as of a conventional type referred to above, and a mathematical model program 34 as provided in accordance with the present invention. Other than the mathematical model program 34, the components shown in FIG. 2 can be of conventional types, such as are found in the ARC Controller and the UNI-PRO II computers from Halliburton Services. It is also to be noted that the computer 8 can be implemented by separate devices, such as one containing the automatic control program 32 and another containing the mathematical model program 34.

Figure 3:
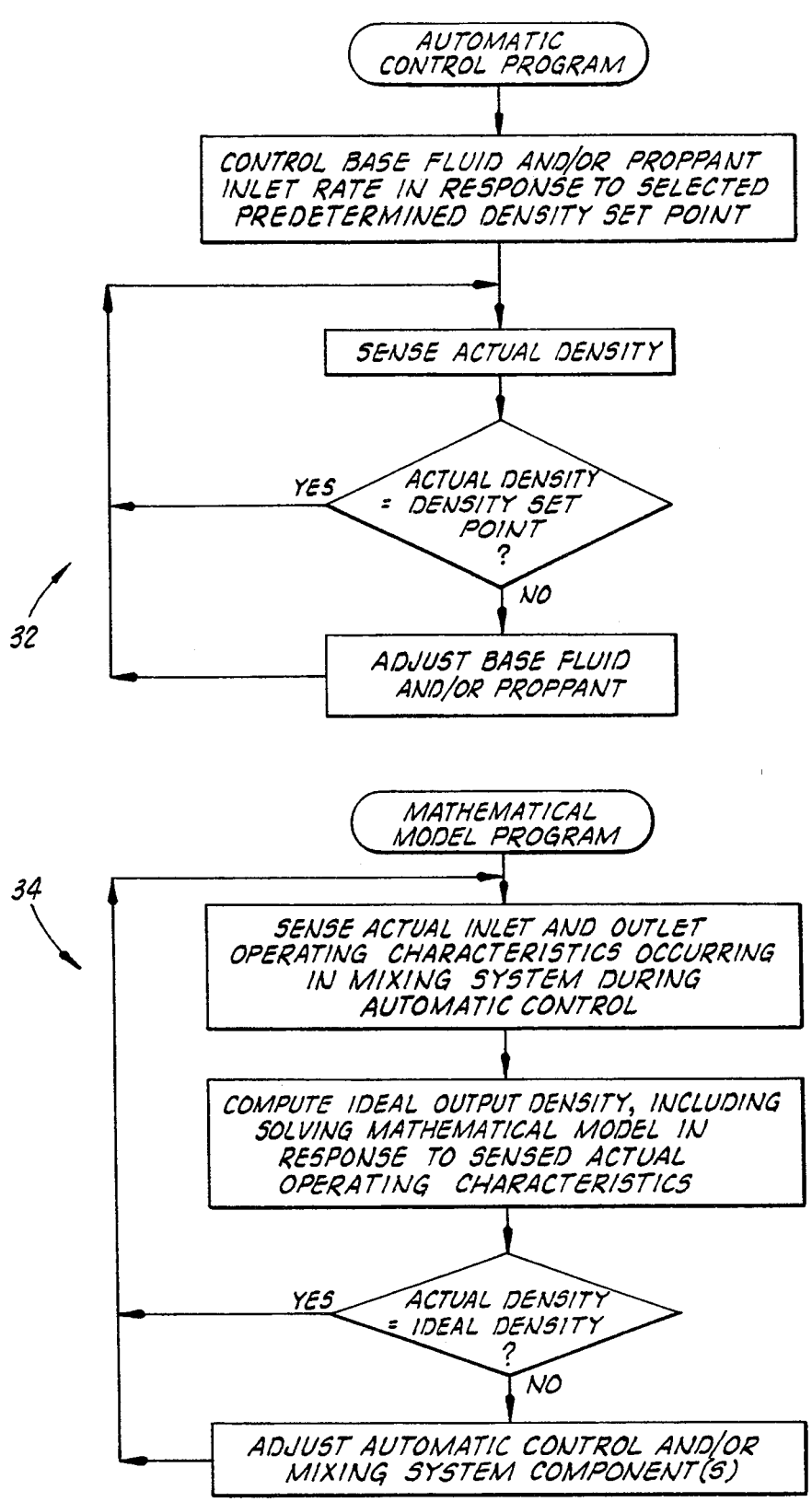
FIG. 3 is a flow chart of the present invention in conjunction with a flow chart of an automatic control program.

Referring to FIG. 3, a simplified flow chart of a known automatic control program 32 is shown. This program initially controls either or both of the fluid rate control 4 and/or the proppant rate control 6 (only the latter in the example given above). This control is based on a predetermined desired output characteristic (e.g., density as shown in FIG. 3, or, more specifically, sand concentration in a specific control program for automatically mixing a fracturing fluid). Once started, the program 32 then senses the actual output characteristic (density in FIG. 3) and compares it to the predetermined set point. If the actual density (for the FIG. 3 illustration) is within some predetermined tolerance of the predetermined density set point, the mixture is acceptable so the program 32 loops back to continue checking. If the actual density is outside the tolerance, the program 32 automatically adjusts the appropriate inlet flow(s) (e.g., the proppant rate control 6 in the above example) and then loops back to continue checking.

Distinct or separate from the automatic control program but run concurrently therewith in the preferred embodiment of the present invention, is the mathematical model program 34 also shown in more detail in FIG. 3. Because of their storage together in the program memory 30 if one computer device 8 is used, and more significantly to illustrate their distinctness as well as their concurrence, the programs 32, 34 are shown together in a single drawing figure. Although not represented in FIG. 3, there can be a direct link between the two programs 32, 34 such as by the program 34 providing automatic adjustment to the program 32 if determined by the program 34 to be so necessary.

As set forth in FIG. 3, the mathematical model program 34 operates in response to requisite actual inlet and outlet operating characteristics occurring in the mixing system during automatic control that is effected by the program 32 as described above. In the illustrated embodiment, these characteristics are inlet fluid flow, inlet proppant flow, mixture level in the tub 2, outlet flow, and one or two density measurements. Using these inputs to solve a mathematical model further described below, the program 34 computes an ideal output characteristic, such as density in the example that I have been primarily referring to. For this example, the program 34 then compares the actual density to the ideal density, which is not necessarily the same value as the predetermined density set point with which the automatic control program 32 is concerned. If the actual density is within a predetermined tolerance of the computed ideal density, the program 34 loops back to continue checking. If the actual density varies sufficiently from the ideal density, then one or more adjustments can be made. An analysis of the comparison between the actual density and the ideal density should facilitate determining whether the automatic control program 32 or the mechanical equipment of the mixing system needs to be changed. It is contemplated that such adjustment can be made manually or automatically. For example, the program 34 can cause one or more outputs to be output by the computer 8 to notify an operator that a meaningful variation between the actual and ideal characteristics exists and what possible causes for the variation might be. In response to such output the operator can take suitable action. As another example, the program 34 can include means for computing appropriate adjustment signals in response to a meaningful variance being determined, which adjustment signals then cause the computer 8 to automatically adjust the speed at which the agitator in the tub 2 is operated.

For a particular implementation of the system shown in FIG. 1, assuming 100 percent mixing efficiency in the tub 2 and using a continuity analysis of the tub 2, a specific mathematical model is as follows:

$$D_{O(t)} = D_{O(t-1)} + \frac{D_L Q_L + D_S Q_S - D_{O(t-1)}(Q_L + Q_S)}{AL} \quad (1)$$

$$C_{O(t)} = \frac{D_{O(t)} - D_L}{1 - (D_{O(t)} S_{SV})} \quad (2)$$

wherein:
$D_{O(t)}$ = Density of mix exiting tub at current recorded time
$D_{O(t-1)}$ = Density of mix exiting tub at previous recorded time
$D_L$ = Density of liquid (base fluid) entering tub
$D_S$ = Density of sand (proppant) entering tub
$Q_L$ = Liquid flow rate into tub
$Q_S$ = Sand flow rate into tub
A = Surface area of tub
L = Fluid level in tub
$C_{O(t)}$ = Sand concentration exiting tub at current recorded time
$S_{SV}$ = Specific volume of sand $D_L$, $D_S$, A and $S_{SV}$ are set values that are manually entered into the computer. Multiple values can be entered for different stages of mixture, and the program 34 will automatically use the appropriate values for each respective stage.

$Q_L$, $Q_S$ and L are the values of the actual operating characteristics as sensed by the inlet flow meter 10, the proppant inlet rate sensor 14 and the level sensor 16, respectively.

$D_{O(t)}$, $D_{O(t-1)}$ and $CO_{(O(t)}$ are the computed ideal characteristics for the respective times (i.e., current and previous).

These parameters and computed ideal characteristics are used by the program 34 in comparison with the actual output values for outlet flow rate and density obtained from the outlet flow meter 18 and either or both of the densimeters 12, 20. The actual and ideal densities can be directly compared and sand concentrations can also be used after deriving an actual sand concentration in known manner from the actual density. The outlet flow rate can be used relative to the sensed inlet flows and the amount in the tub as a double-check whereby sensor problems can be detected.

From the foregoing, the mathematical model program 34, containing the necessary mathematical equations, loaded into the computer 8 provides means for defining at the oil or gas well site a predetermined mathematical model of the mixing system (e.g., equations 1 and 2 above) and for providing at the oil or gas well site a numerical ideal output characteristic of the mixing system (e.g., $D_{O(t)}$ or $C_{O(t)}$ above) in response to actual characteristics of the mixing system sensed at the oil or gas well site [e.g., $Q_L$, $Q_S$, L above].

The program 34 loaded in the computer 8 also provides, at least in part, means for comparing the numerical ideal output characteristic (determined by solving the mathematical equations) and the quantified actual output characteristic (determined in response to the signal from at least the densimeter 12 in the example) at the oil or gas well site to determine how closely the actual output characteristic corresponds to the ideal output characteristic. This comparing means also can include means for displaying both the numerical ideal output characteristic and the quantified actual output characteristic in combination to visually depict numerical variations therebetween, such as implemented by a display 36 shown in FIG. 1. The display 36 can be a video monitor or a chart recorder or other suitable device known in the art. An example of a comparison output from such a device is shown in FIG. 4.

Figure 4:
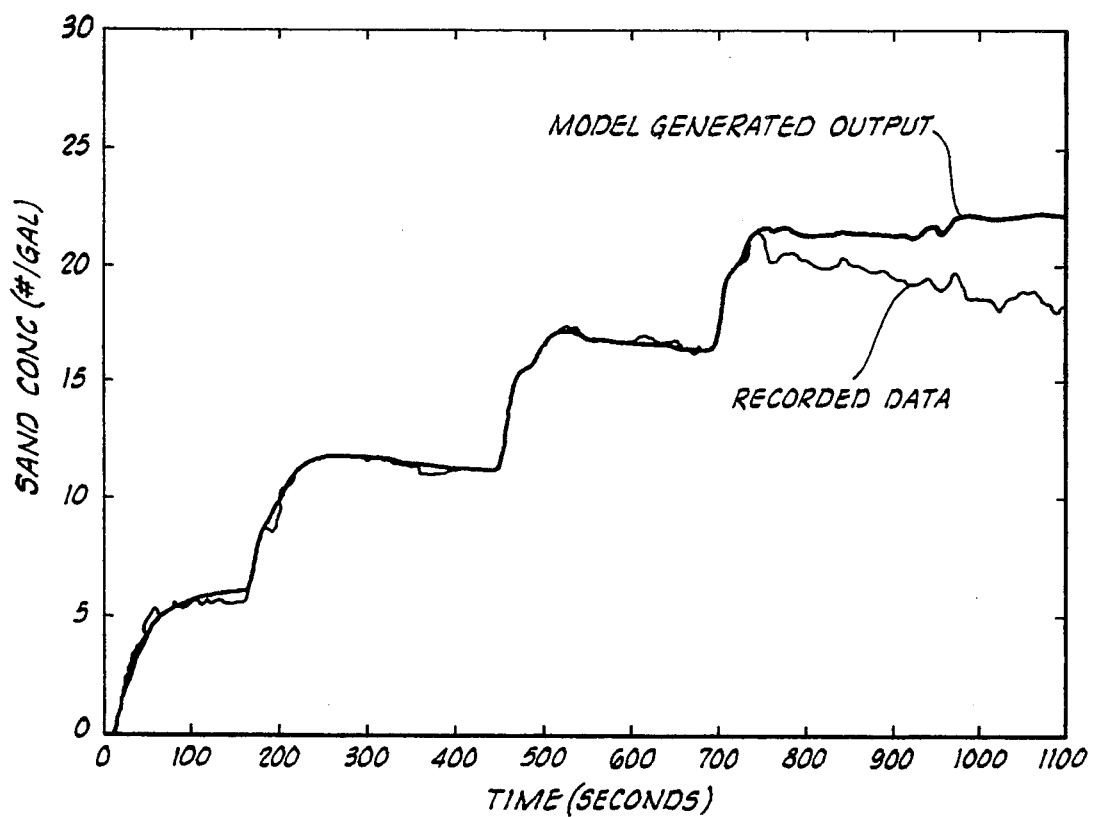
FIG. 4 is a representation of a display comparing an actual output characteristic and an ideal output characteristic of the present invention.

In the comparison illustrated in FIG. 4, the mixing system was having no problems until the concentration was raised to 22 pounds per gallon. From this point sand concentration could not be maintained as shown by the diverging lines representing the model generated (ideal) output and the recorded (actual) data. The model indicated that the sand concentration should have been substantially constant while the recorded data indicated that the actual sand concentration was declining. The model assumed 100 percent mixing efficiency in the tub 2. Therefore, for the actual sand concentration to decrease, then the sand must have been falling out of suspension somewhere in the mixing system. The agitation due to fluid velocity was too low in the discharge manifold to maintain suspension of the high sand concentration in the base fluid; therefore, the discharge manifold was modified to provide higher velocity (agitation) to maintain suspension of the sand.

Through use of the system of the present invention described above, a method of the present invention can be performed for determining, and in particular quantifying, a mixing efficiency of a mixing system, such as the mixing system of FIG. 1 having the base fluid and sand slurry mixed therein and pumped therefrom through a line from the tub 2 to the oil or gas well. One of the steps is defining a mathematical model of the mixing system. This includes selecting a plurality of input parameters and an output parameter related to the input parameters to define the model for a particular system. This can be done prior to going to the well site with the mixing system. This step of defining more specifically includes having the predetermined mathematical model equations loaded in the computer 8, and ready to operate at the well site. A particular example of this is expressed in equations (1) and (2) above.

Another step of the method is sensing a plurality of actual operating characteristics of the mixing system at the well site during operation of the mixing system, wherein each of the actual characteristics is of the same type as a respective one of the input parameters of the mathematical model. With regard to the preferred embodiment system described above, this includes: sensing input rate of the base fluid provided to tub 2 and generating an electrical signal representative of base fluid input rate (via the inlet flow meter 10 in the FIG. 1 embodiment); sensing input rate of sand (proppant) provided to the tub 2 and generating an electrical signal representative of the sand input rate (via the proppant inlet rate sensor 14 in the FIG. 1 embodiment); and sensing the level of the slurry in the tub 2 and generating an electrical signal representative of the slurry level (via the level sensor 16 in the FIG. 1 embodiment). For use in making an analysis as referred to above, another actual operating characteristic sensed is output rate of the slurry pumped from the tub 2 through the outlet line (an electrical signal representative of the slurry output rate is generated by the outlet flow meter 18).

A further step of the method is sensing an actual output mixing characteristic of the mixing system during the operation of the mixing system. In the preferred embodiment, this includes measuring density of the outlet mixture at one or two locations along a flow path of the mixture flowing from the mixing system. This is done by generating an electrical signal through one or both of the densimeters 12, 20. In a particular implementation, such as for the mathematical model of equations (1) and (2), the measured density can be converted to sand (proppant) concentration as the specific term for comparison.

Also performed during the operation of the mixing system is the step of inputting signals representing the sensed actual operating characteristics into a computer programmed with the mathematical model. Each of these signals defines a respective input parameter of the mathematical model. In particular, electrical signals from the various sensing devices are communicated at the well to the computer 8 which is programmed with the mathematical model of the mixing system. As defined above in equations (1) and (2), that particular mathematical model directly includes input parameters corresponding to base fluid input rate, sand input rate and slurry level; and slurry output rate can also be used as described above.

Also during the operation of the mixing system of the preferred embodiment, an ideal output mixing characteristic is determined. This includes computing a specific value for the output parameter of the mathematical model in response to the input signals referred to above. In the particular implementation, the ideal density and sand concentration are determined by solving equations (1) and (2) of the particular mathematical model in response to the communicated electrical signals.

Another step of the invention performed during the operation of the mixing system is the step of numerically comparing the ideal output mixing characteristic to the actual output mixing characteristic. As illustrated in FIG. 4, in the particular implementation this includes characterizing the ideal output mixing characteristic and the actual output mixing characteristic by respective numerical values and displaying a representation showing the difference therebetween, thereby quantifying the mixing efficiency of the mixing system during the operation of the mixing system. By comparing the ideal sand concentration and the actual sand concentration (used as the output characteristics in the particular implementation), one can indicate at what sand concentration the base fluid can no longer transport the sand at a then existing agitation level as illustrated in FIG. 4 and explained above.

The method further comprises adjusting the mixing system when the compared ideal output mixing characteristic and the actual output mixing characteristic show that the mixing system is not obtaining an actual output mixing characteristic within a desired range or tolerance of the ideal output mixing characteristic. In one example wherein density is sensed by the densimeter 12 at the outlet of the tub 2, one type of adjustment that can be made is to increase agitation in the tub 2 when it is determined that agitation in the tub is otherwise unable to support at least part of the sand as indicated by the actual sand concentration being increasingly less than the ideal sand concentration (such as indicated by the example of FIG. 4). In another example wherein density is sensed by at least the densimeter 20, one type of adjustment that can be made is to increase agitation in the outlet line when it is determined that agitation in the line is unable to support at least part of the sand as indicated by the actual sand concentration as determined from the density sensed downstream of the outlet of the tub being increasingly less than the ideal sand concentration.

The method of the present invention can further comprise, also during the operation of the mixing system, automatically controlling the mixing system separately from comparing the ideal output mixing characteristic to the actual output mixing characteristic. This is implemented by the automatic control program 32 in the preferred embodiment. As explained above, however, the two programs 32, 34 can be interrelated such as by the mathematical model program 34 automatically adjusting the automatic control program 32.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A quantitative mixing efficiency determination system for controlling mixing at an oil or gas well site, comprising:

a mixing system disposed at an oil or gas well site;

means, connected to said mixing system, for sensing a plurality of actual characteristics of said mixing system;

means for defining at the oil or gas well site a predetermined mathematical model of said mixing system and for providing at the oil or gas well site a numerical ideal output characteristic of said mixing system in response to said plurality of actual characteristics of said mixing system sensed at the oil or gas well site;

means, connected to said mixing system, for sensing an actual output characteristic of said mixing system and quantifying said sensed actual output characteristic; and means, connected to said means for defining and providing and to said means for sensing an actual output characteristic, for comparing said numerical ideal output characteristic and said quantified actual output characteristic at the oil or gas well site to determine how closely the actual output characteristic corresponds to the ideal output characteristic wherein:

said means for defining and providing includes a digital computer disposed at the well site and programmed with at least one equation implementing said mathematical model;

said mixing system includes a mixing tub wherein at least a first material and a second material are mixed;

said means for sensing a plurality of actual characteristics includes:
  a first inlet sensor monitoring said first material;
  a second inlet sensor monitoring said second material; and
  a level sensor monitoring a level of mixture in said tub;

said means for sensing an actual output characteristic includes an outlet sensor monitoring the outlet flow of the mixture from said tub; and wherein said sensors provide respective signals to said computer so that signals from said first inlet sensor, said second inlet sensor and said level sensor define values used in said at least one equation for computing said numerical ideal output characteristic and so that a signal from said outlet sensor defines a value for said quantified actual output characteristic.

2. A system as defined in claim 1, further comprising means for displaying both said numerical ideal output characteristic and said quantified actual output characteristic in combination to visually depict numerical variations therebetween.

3. A system as defined in claim 2, wherein said outlet sensor includes a first densimeter, disposed in an outlet line from said tub, and wherein said means for sensing an actual output characteristic further includes a second densimeter, disposed in said outlet line farther from said tub than said first densimeter, both said first and second densimeters providing electrical signals to said computer.

4. A system as defined in claim 3, wherein said mixing system further comprises means for automatically controlling the mixing of said first and second materials in said tub.

5. A method of quantifying mixing efficiency of a mixing system at an oil or gas well site, comprising.:

defining a mathematical model of the mixing system, including selecting a plurality of input parameters and an output parameter related to said input parameters;

sensing a plurality of actual operating characteristics of the mixing system at the well site during operation of the mixing system, each of the actual operating characteristics being of the same type as a respective one of the input parameters of the mathematical model;

sensing an actual output mixing characteristic of the mixing system during the operation of the mixing system;

during the operation of the mixing system, inputting signals representing the sensed actual operating characteristics into a computer programmed with the mathematical model, each of these signals defining a value for a respective one of the input parameters;

during the operation of the mixing system, defining an ideal output mixing characteristic, including computing a specific value for the output parameter of the mathematical model in response to the input signals; and during the operation of the mixing system, characterizing the ideal output mixing characteristic and the actual output mixing characteristic by respective numerical values and simultaneously displaying a representation of the ideal output mixing characteristic and the actual output mixing characteristic so that any difference therebetween is shown, thereby quantifying the mixing efficiency of the mixing system during the operation of the mixing system.

6. A method as defined in claim 5, further comprising adjusting the mixing system when the displayed ideal output mixing characteristic and the displayed actual output mixing characteristic show that the mixing system is not obtaining an actual output mixing characteristic within a desired range of the ideal output mixing characteristic.

7. A method as defined in claim 6, wherein sensing the actual output mixing characteristic includes measuring density of a mixture at two locations along a flow path of the mixture flowing from the mixing system.

8. A method as defined in claim 5, wherein sensing the actual output mixing characteristics includes measuring density of a mixture at two locations along a flow path of the mixture flowing from the mixing system.

9. A method as defined in claim 5, wherein the selected input parameters for defining the mathematical model include an inlet flow of a first material into a mixing tub, an inlet flow of a second material into the tub and a level of a mixture including the first and second materials in the tub.

10. A method of determining the mixing efficiency of a mixing system having a base fluid and sand slurry mixed therein and pumped therefrom through a line from a tub of the mixing system to an oil or gas well, comprising:

flowing base fluid into the tub;

flowing sand into the tub;

mixing the base fluid and sand into slurry in the tub at a mixing agitation level;

pumping slurry out of the tub through the line at an output agitation level;

sensing input rate of base fluid provided to the tub and generating an electrical signal representative of the base fluid input rate;

sensing input rate of sand provided to the tub and generating an electrical signal representative of the sand input rate;

sensing the level of slurry in the tub and generating an electrical signal representative of the slurry level;

sensing density of the slurry pumped from the tub through the line and generating an electrical signal representative of the slurry density;

communicating the electrical signals at the well to a computer programmed with a mathematical model of the mixing system, the mathematical model including input parameters corresponding to base fluid input rate, sand input rate and slurry level;

determining in the computer an ideal sand concentration, including solving the mathematical model in response to the communicated electrical signals;

determining an actual sand concentration in response to the signal representative of the sensed density; and comparing the ideal sand concentration and the actual sand concentration for indicating at what sand concentration the base fluid can no longer transport the sand at at least one of the then existing agitation levels.

11. A method as defined in claim 10, wherein:

said sensing density includes sensing density of the slurry at an outlet of the tub; and said method further comprises determining that agitation in the tub is unable to support at least part of the sand in response to the step of comparing representing that the actual sand concentration as determined from the density sensed at the outlet of the tub is increasingly less than the ideal sand concentration.

12. A method as defined in claim 10, wherein:

said sensing density includes sensing density of the slurry in the line downstream of an outlet of the tub; and said method further comprises determining that agitation in the line is unable to support at least part of the sand in response to the step of comparing representing that the actual sand concentration as determined from the density sensed downstream of the outlet of the tub is increasingly less than the ideal sand concentration.

13. A method as defined in claim 10, further comprising adjusting the mixing system when the compared ideal sand concentration and the actual sand concentration show that the mixing system is not obtaining an actual sand concentration within a desired range of the ideal sand concentration.

* * * * *